(12) United States Patent
Sano

(10) Patent No.: US 11,667,161 B2
(45) Date of Patent: Jun. 6, 2023

(54) PNEUMATIC TIRE

(71) Applicant: Toyo Tire Corporation, Itami (JP)

(72) Inventor: Shingo Sano, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/715,127

(22) Filed: Apr. 7, 2022

(65) Prior Publication Data
US 2022/0339974 A1    Oct. 27, 2022

(30) Foreign Application Priority Data
Apr. 26, 2021 (JP) .............................. JP2021-073863

(51) Int. Cl.
*B60C 13/02* (2006.01)
*B60C 11/01* (2006.01)
*B60C 11/03* (2006.01)

(52) U.S. Cl.
CPC .............. *B60C 13/02* (2013.01); *B60C 11/01* (2013.01); *B60C 11/0306* (2013.01)

(58) Field of Classification Search
CPC ....... B60C 13/02; B60C 13/001; B60C 13/00; B60C 11/01
See application file for complete search history.

(56) References Cited

U.S. PATENT DOCUMENTS

D553,560 S * 10/2007 Dixon .......................... D12/605
2010/0288409 A1    11/2010 Ohara

FOREIGN PATENT DOCUMENTS

| CN | 108407347 A | * | 8/2018 | ......... B29D 30/0606 |
| DE | 102019219311 A1 | * | 6/2021 | |
| JP | 2010-264962 A | | 11/2010 | |

OTHER PUBLICATIONS

CN 108407347 Machine Translation; Li,Cheng-lin (Year: 2018).*
DE 102019219311 Machine Translation; Schurmann, Oliver (Year: 2019).*

* cited by examiner

*Primary Examiner* — Katelyn W Smith
*Assistant Examiner* — Nicholas J Weiler
(74) *Attorney, Agent, or Firm* — WHDA, LLP

(57) ABSTRACT

A pneumatic tire includes a sidewall extending in a tire radial direction, the sidewall comprises a first side block which protrudes outwardly in a tire axial direction, the first side block comprises a first base portion which extends in the tire radial direction, and a first inclined portion and second inclined portion which extend from an inner end in the tire radial direction of the first base portion, the first inclined portion extends increasingly toward a first side in a tire circumferential direction as one proceeds toward an interior in the tire radial direction, and the second inclined portion extends increasingly toward a second side in the tire circumferential direction as one proceeds toward the interior in the tire radial direction.

20 Claims, 6 Drawing Sheets

PNEUMATIC TIRE

CROSS REFERENCE TO RELATED APPLICATIONS

This application claims the benefit of priority of Japanese application no. 2021-73863, filed on Apr. 26, 2021, which is incorporated herein by reference.

BACKGROUND OF THE INVENTION

Field of the Invention

The present disclosure relates to a pneumatic tire.

Description of the Related Art

Conventionally a pneumatic tire might, for example, comprise a sidewall extending in the tire radial direction, and the sidewall might comprise a plurality of side blocks protruding toward the exterior in the tire axial direction (e.g., JP 2010-264562 A). In addition, side blocks permit improvement in terms of performance with respect to traction (e.g., ability of side block surface and/or edge components to produce traction when in contact with snow, mud, sand, rock, and/or the like).

At the pneumatic tire associated with JP 2010-264962 A, it so happens that the side blocks all extend in the tire radial direction. Because this only makes it possible to ensure lengths of edges corresponding to dimensions in the tire radial direction of side blocks, it is thought that it leaves room for further improvement in terms of performance with regard to sidewall traction.

SUMMARY OF THE INVENTION

It is an object of the present disclosure to provide a pneumatic tire permitting improvement in performance with respect to sidewall traction.

There is provided a pneumatic tire comprises a sidewall extending in a tire radial direction;
wherein the sidewall comprises a first side block which protrudes outwardly in a tire axial direction;
wherein the first side block comprises
a first base portion which extends in the tire radial direction, and
a first inclined portion and second inclined portion which extend from an inner end in the tire radial direction of the first base portion;
wherein the first inclined portion extends increasingly toward a first side in a tire circumferential direction as one proceeds toward an interior in the tire radial direction; and
wherein the second inclined portion extends increasingly toward a second side in the tire circumferential direction as one proceeds toward the interior in the tire radial direction.

DETAILED DESCRIPTION OF THE INVENTION

Below, an embodiment of a pneumatic tire is described with reference to FIG. 1 through FIG. 6. At the respective drawings, note that dimensional ratios at the drawings and actual dimensional ratios are not necessarily consistent, and note further that dimensional ratios are not necessarily consistent from drawing to drawing.

Note that the respective dimensions, positional relationships, relative magnitudes, and so forth that are indicated below should be understood to be as measured under normal conditions when the pneumatic tire (hereinafter also referred to as simply "tire") 1 mounted on a normal rim and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of TRA, or "inflation pressure" in the case of ETRTO.

At the respective drawings, first direction D1 is the tire axial direction D1 which is parallel to the tire rotational axis, second direction D2 is the tire radial direction D2 which is the direction of the diameter of tire 1, and third direction D3 is the tire circumferential direction D3 which is the direction that is circumferential with respect to the rotational axis of the tire. Furthermore, tire equatorial plane S1 refers to a plane that is located centrally in the tire axial direction D1 and that is perpendicular to the rotational axis of the tire; tire meridional planes S2 through S7 refer to planes that are perpendicular to tire equatorial plane S1 and that contain the rotational axis of the tire.

In the tire axial direction D1, note that toward the interior means nearer to tire equatorial plane S1, and note that toward the exterior means farther away from tire equatorial plane S1. Furthermore, in the tire radial direction D2, note that toward the interior means nearer to the tire rotational axis, and toward the exterior means farther away from the tire rotational axis. Furthermore, the tire circumferential direction D3 may be further subdivided into first side D31, which is also referred to as first circumferential direction side D31; and second side D32, which is also referred to as second circumferential direction side D32.

Figure 1:
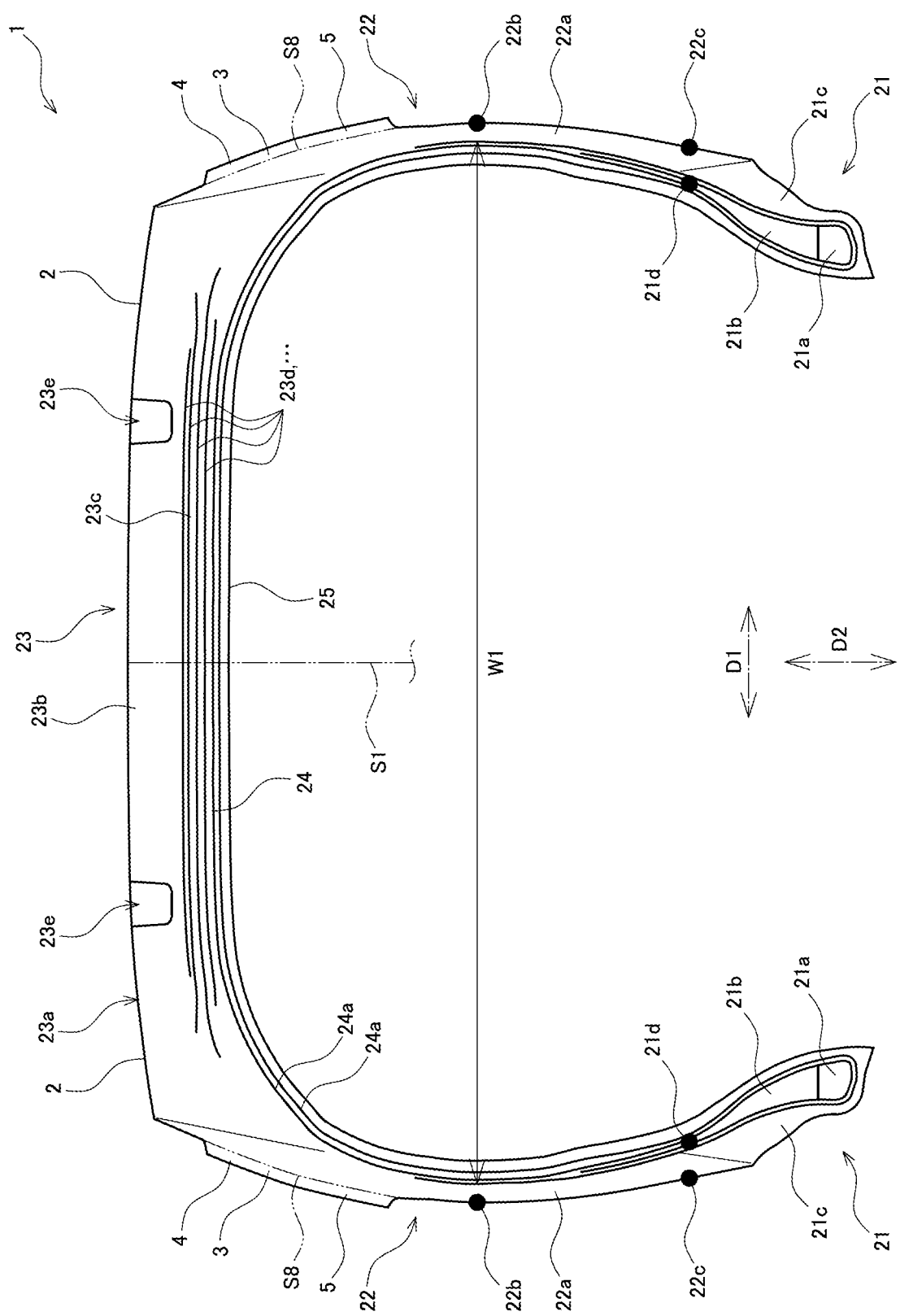
FIG. 1 is a view of a section, taken along a tire meridional plane, of the principal components in a pneumatic tire associated with an embodiment.

As shown in FIG. 1, for example, tire 1 may comprise a pair of bead regions 21; sidewalls 22 which extend outwardly in the tire radial direction D2 from the respective bead regions 21; and tread 23 which is contiguous with the respective outer ends in the tire radial direction D2 of the pair of sidewalls 22, 22 and which has tread surface 23a that contacts the road surface toward the exterior in the tire radial direction D2. Note that tire 1 may, for example, be mounted on a rim (not shown).

For example, Bead region 21 may comprise bead core 21*a* which is formed so as to be annular in shape, and bead filler 21*b* which is arranged toward the exterior in the tire radial direction D2 from bead core 21*a*. For example, bead core 21*a* might be formed by laminating rubber-covered bead wires (e.g., metal wires), and bead filler 21*b* might be formed from hard rubber that has been made to taper as one proceeds toward the exterior in the tire radial direction D2.

Furthermore, for example, tire 1 may comprise carcass 24 suspended between pair of bead cores 21*a*, 21*a*; and inner liner 25 that is arranged toward the interior from carcass 24 and that faces the interior space of tire 1 which is or will be filled with air. For example, carcass 24 and inner liner 25 may be arranged in parallel fashion with respect to the inside circumferential surface of the tire over a portion thereof that encompasses bead regions 21, sidewalls 22, and tread 23.

For example, bead region 21 may comprise rim strip rubber 21*c* which is arranged toward the exterior in the tire axial direction D1 from carcass 24 and which is intended to constitute the outer surface that will come in contact with the rim. Further, for example, sidewall 22 may comprise sidewall rubber 22*a* which is arranged toward the exterior in the tire axial direction D1 from carcass 24 and which is intended to constitute the outer surface.

For example, tread 23 may comprise tread rubber 23*b* which constitutes tread surface 23*a*, and belt 23*c* which is arranged between tread rubber 23*b* and carcass 24. Belt 23*c* may comprise a plurality (four at FIG. 1) belt plies 23*d*. For example, belt plies 23*d* might comprise a plurality of belt cords (e.g., organic fiber and/or metal) which are arrayed in parallel fashion, and topping rubber with which the belt cords are covered.

Carcass 24 may be made up of at least one (two at FIG. 1) carcass ply 24*a*. For example, carcass ply 24*a* may fold back upon itself and wraps about bead core 21*a* so as to envelop bead core 21*a*. Furthermore, for example, carcass ply 24*a* may comprise a plurality of ply cords (e.g., organic fiber and/or metal) which are arrayed in directions more or less perpendicular to the tire circumferential direction D3, and topping rubber with which the ply cords are covered.

Inner liner 25 may have superior functionality in terms of its ability to impede passage of gas therethrough so as to permit air pressure to be maintained. The constitution at sidewall 22 may be such that, as is the case in the present embodiment, inner liner 25 is in intimate contact with the inside circumferential surface of carcass 24, there being no other member that intervenes between inner liner 25 and carcass 24.

Furthermore, distance between the inside circumferential surface of the tire (inside circumferential surface of inner liner 25) and the carcass ply 24*a* which is arranged nearest to the inside circumferential surface might, for example, be made to be 90% to 180% at sidewall 22 of what it is at tread 23. Furthermore, this distance might, for example, be made to be 120% to 160% at sidewall 22 of what it is at tread 23.

Provided at the outer surface of sidewalls 22 are locations 22*b* which are at the same locations in the tire radial direction D2 as the locations at which tire width is a maximum (more specifically, the locations at which distance W1 between respective exterior points in the tire axial direction D1 of carcass 24 is a maximum). Below, these locations 22*b* are referred to as tire maximum width locations 22*b*.

Furthermore, provided at the outer surface of sidewalls 22 are locations 22*c* which are at the same locations in the tire radial direction D2 as outer ends 21*d* in the tire radial direction D2 of bead filler 21*b*. Below, these locations 22*c* are referred to as bead end locations 22*c*.

Figure 2:
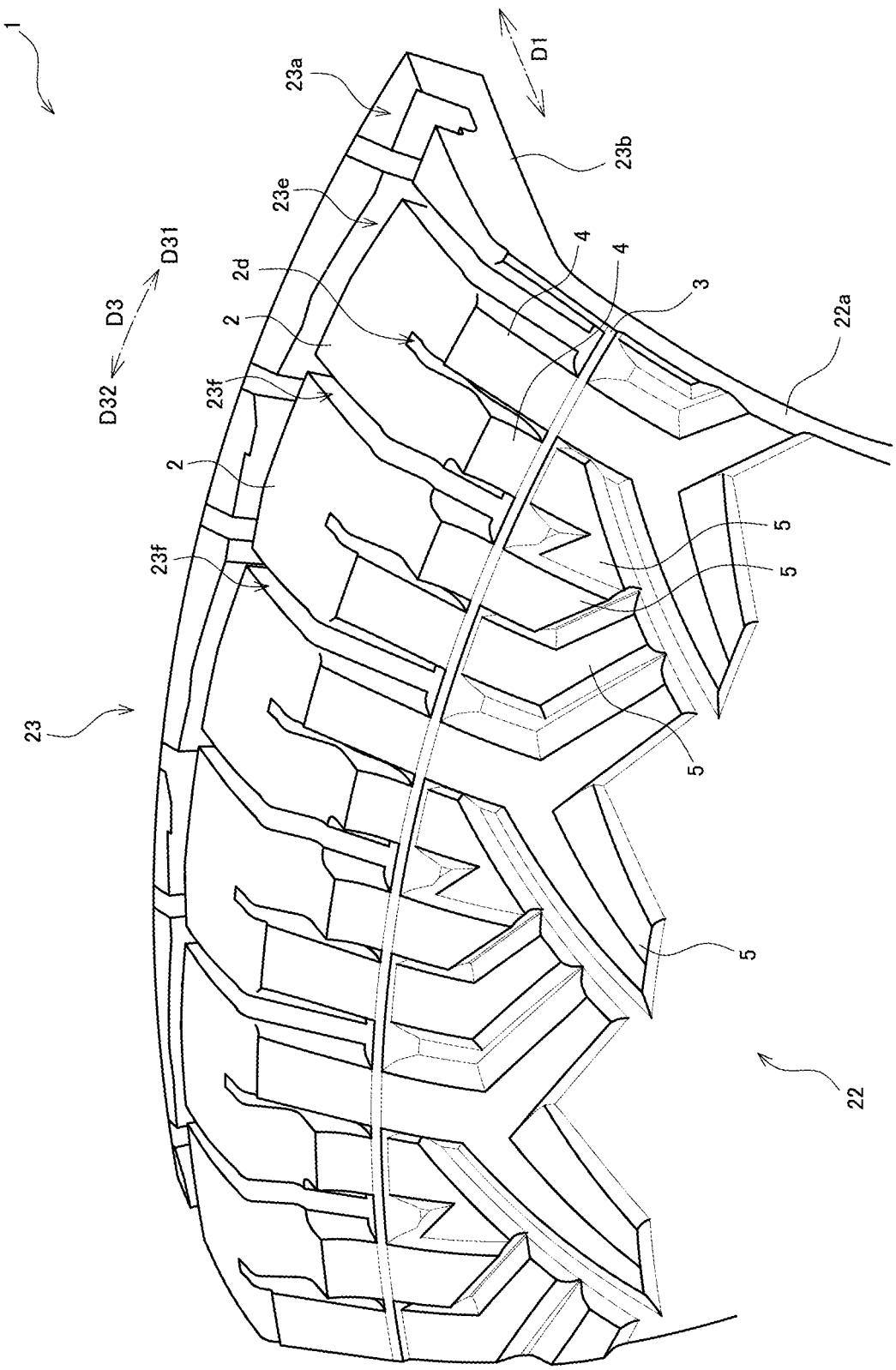
FIG. 2 is a perspective view of the principal components in a pneumatic tire associated with same embodiment.

As shown in FIG. 1 and FIG. 2, tread rubber 23*b* may comprise a plurality of main grooves 23*e* that extend continuously in the tire circumferential direction D3 along the entire length in the tire circumferential direction D3 of tread surface 23*a*. In addition, tread rubber 23*b* may comprise a plurality of width grooves 23*f* which extend from a main groove 23*e* which is arranged in outermost fashion in the tire axial direction D1 (sometimes referred to as "shoulder main groove") to an outer end in the tire axial direction D1, and a plurality of tread blocks 2 which are partitioned by shoulder main groove 23*e* and plurality of width grooves 23*f*.

As shown in FIG. 2, sidewall rubber 22*a* may, e.g., as is the case in the present embodiment, comprise annular projection 3 which protrudes toward the exterior in the tire axial direction D1, and buttress block 4 which protrudes toward the exterior in the tire axial direction D1. Furthermore, it is preferred, e.g., as is the case in the present embodiment, that sidewall rubber 22*a* comprise side block 5 which protrudes toward the exterior in the tire axial direction D1.

Annular projection 3 might, for example, extend continuously in the tire circumferential direction D3 along the entire length in the tire circumferential direction D3 of sidewall rubber 22*a*. The dimension in the tire radial direction D2 of annuls r projection 3 might, for example, be constant (here and below understood to mean not only the situation in which this is the same but to also include situations in which this is approximately the same such that there is a difference of ±10% thereat) all along the tire circumferential direction D3. Furthermore, the height by which annular projection 3 protrudes might, for example, be constant all along the tire circumferential direction D3.

Pluralities of buttress blocks 4 and of side blocks 5 might, for example, be respectively arrayed along the tire circumferential direction D3. In addition, a constitution might be adopted in which buttress blocks (s) 4 are for example arranged at location(s) toward the exterior in the tire radial direction D2 from annular projection 3, and in which side block(s) 5 are for example arranged at location(s) toward the interior in the tire radial direction D2 from annular projection 3.

Note that whereas in the present embodiment the inner end in the tire radial direction D2 of buttress block 4 is contiguous with annular projection 3, it may for example be separated from annular projection 3. Furthermore, whereas in the present embodiment the outer end in the tire radial direction D2 of side block 5 is contiguous with annular projection 3, it may for example be separated from annular projection 3.

In addition, it is preferred for example that annular projection(s) 3, buttress block(s) 4, and side block(s) 5 be arranged at locations toward the exterior in the tire radial direction D2 from bead end location 22*c* (see FIG. 1). Furthermore, it is even more preferred, e.g., as is the case in the present embodiment, that annular projection(s) 3, buttress block(s) 4, and side block(s) 5 be arranged at locations toward the exterior in the tire radial direction D2 from tire maximum width location 22*b* (see FIG. 1).

As a result, on a snowy road or over muddy or sandy terrain or the like, when the weight of the vehicle causes tire 1 to sink such that it is buried under snow, mud, sand, and/or the like, annular projection(s) 3, buttress block(s) 4, and/or side block(s) 5 are able to come in contact with the ground, and when going over rocky terrain these are able to come in contact with irregular surfaces of rocks. That is, annular projection(s) 3, buttress block(s) 4, and side block(s) 5 come in contact with the ground under bad road conditions such as when on a snowy road or over muddy, sandy, or rocky terrain or the like.

In addition, when snow, mud, sand, or the like is, for example, subjected to shearing by annular projection(s) 3, buttress block(s) 4, and side block(s) 5, resistance due to such shearing will cause production of traction. Furthermore, for example, when annular projection(s) 3, buttress block(s) 4, and side block(s) 5 come in contact with rock, friction due to such contact will cause production of traction. Thus, when the vehicle is being driven on a snowy road or under bad road conditions, annular projection(s) 3, buttress block(s) 4, and side block(s) 5 permit improvement in performance with respect to traction.

Note that it is preferred, e.g., as is the case in the present embodiment, that annular projection(s) 3, buttress block(s) 4, and side block(s) 5 be arranged toward the interior in the tire radial direction D2 from tread surface 23*a*. This will make it possible for annular projection(s) 3, buttress block(s) 4, and side block(s) 5 to be made to not come in contact with the ground during normal travel on a flat road.

The positional relationships in the tire circumferential direction D3 among tread block(s) 2, buttress block(s) 4, and side block(s) 5 associated with the present embodiment will now be described with reference to FIG. 3. Note, however, that the positional relationships in the tire circumferential direction D3 among tread block(s) 2, buttress block(s) 4, and side block(s) 5 are not limited to the following constitution.

Figure 3:
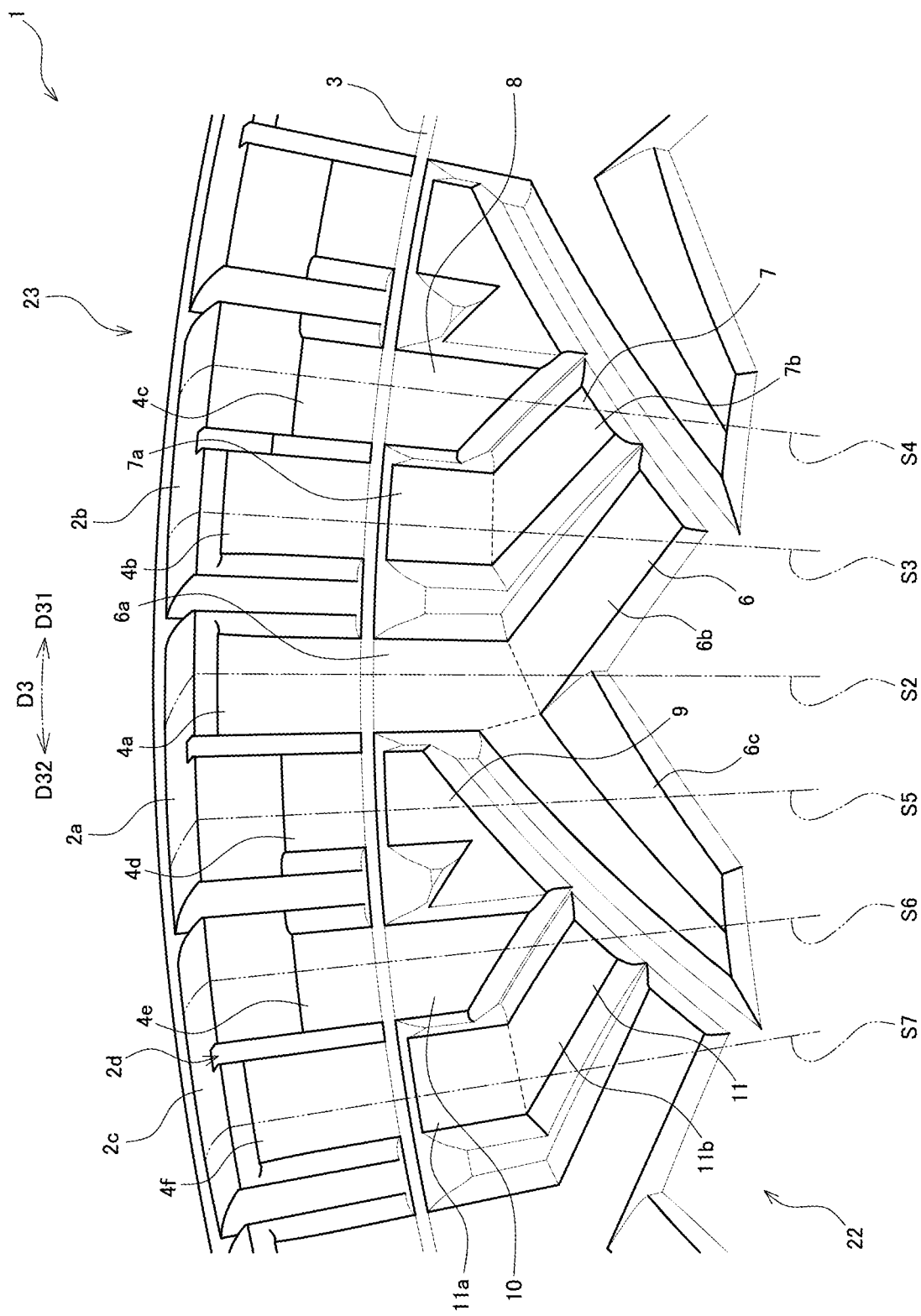
FIG. 3 is a side view of the principal components of a pneumatic tire associated with same embodiment.

As shown in FIG. 3, plurality of tread blocks 2 might, for example, include first tread block 2*a*, second tread block 2*b* which is adjacent at the first circumferential direction side D31 of first tread block 2*a*, and third tread block 2*c* which is adjacent at the second circumferential direction side D32 of first tread block 2*a*.

Plurality of buttress blocks 4 might, for example, include first buttress block 4*a*; second buttress block 4*b* and third buttress block 4*c* which are arrayed in order toward the first circumferential direction side D31 from first buttress block 4*a*; and fourth buttress block 4*d*, fifth buttress block 4*e*, and sixth buttress block 4*f* which are arrayed in order toward the second circumferential direction side D32 from first buttress block 4*a*.

Note, for example, that first and second buttress blocks 4*a*, 4*b*, and fourth and fifth buttress blocks 4*d*, 4*e*, may respectively be partitioned by width grooves 23*f*. Furthermore, for example, first and fourth buttress blocks 4*a*, 4*d*, second and third buttress blocks 4*b*, 4*c*, and fifth and sixth buttress blocks 4*e*, 4*f*, may respectively be partitioned by partitioning grooves 2*d* of tread blocks 2.

Furthermore, plurality of side blocks 5 might, for example, include first side block 6; second side block 7 and third side block 8 which are arrayed in order toward the first circumferential direction side D31 from first side block 6; and fourth side block 9, fifth side block 10, and sixth side block 11 which are arrayed in order toward the second circumferential direction side D32 from first side block 6.

In addition, it is also possible to adopt a constitution in which, for example, first side block 6 and first buttress block 4*a* and first tread block 2*a* intersect a common first tire meridional plane S2. Furthermore, it is also possible to adopt a constitution in which, for example, second side block 7 and second buttress block 4*b* and second tread block 2*b* intersect a common second tire meridional plane S3, and in which third side block 8 and third buttress block 4*c* and second tread block 2*b* intersect a common third tire meridional plane S4.

Furthermore, it is also possible to adopt a constitution in which, for example, fourth side block 9 and fourth buttress block 4*d* and first tread block 2*a* intersect a common fourth tire meridional plane S5. Furthermore, it is also possible to adopt a constitution in which, for example, fifth side block 10 and fifth buttress block 4*e* and third tread block 2*c* intersect a common fifth tire meridional plane S6, and in which sixth side block 11 and sixth buttress block 4*f* and third tread block 2*c* intersect a common sixth tire meridional plane S7.

The constitutions of side blocks 6, 7, 8, 9, 10, 11 associated with the present embodiment will next be described with reference to FIG. 3 through FIG. 6. Note, however, that the constitutions of side blocks 6, 7, 8, 9, 10, 11 are not limited to the following constitutions.

Figure 4:
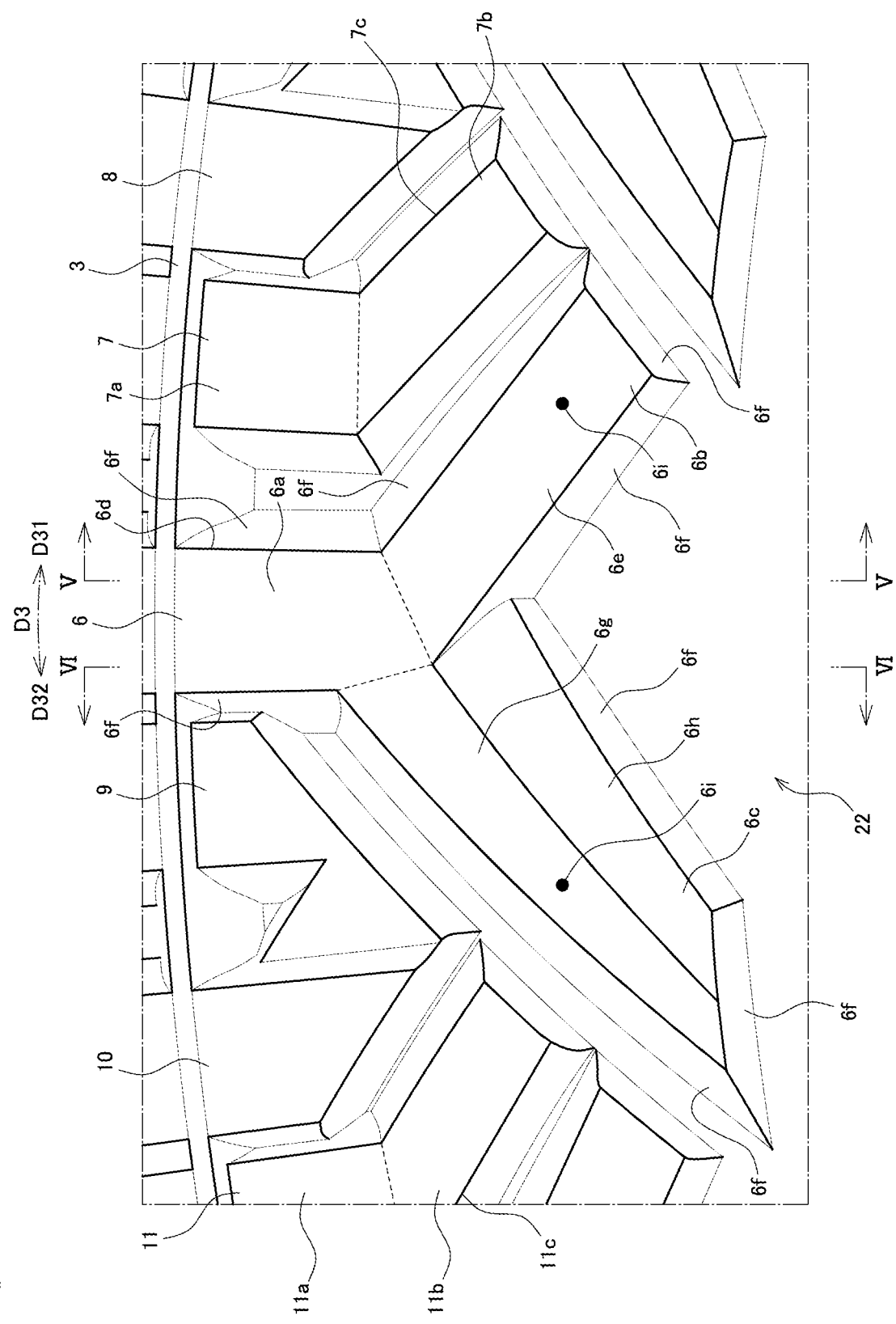
FIG. 4 is an enlarged view of the principal components at FIG. 3.

As shown in FIG. 3 and FIG. 4, it is preferred, e.g., as is the case in the present embodiment, that the constitution be such that the maximum protruding height of first side block 6 is greater than the respective maximum protruding heights of second side block 7 and fourth side block 9; the maximum protruding height of third side block 8 is greater than the maximum protruding height of second side block 7; and the maximum protruding height of fifth side block 10 is greater than the respective maximum protruding heights of fourth side block 9 and sixth side block 11.

Moreover, it is even more preferred that the constitution be such that, at identical locations in the tire radial direction D2, the height to which first side block 6 protrudes is greater than the respective heights to which second side block 7 and fourth side block 9 protrude, this being true everywhere therealong in the tire radial direction D2; the height to which third side block 8 protrudes is greater than the height to which second side block 7 protrudes, this being true everywhere therealong in the tire radial direction D2; and the height to which fifth side block 10 protrudes is greater than the respective heights to which fourth side block 9 and sixth side block 11 protrude, this being true everywhere therealong in the tire radial direction D2.

This will make it possible to cause formation of differences in height among side blocks 6, 7, 8, 9, 10, 11 which are adjacent in the tire circumferential direction D3. Accordingly, because it will, for example, be possible to cause traction acting in the tire circumferential direction D3 to be adequately produced by first side block 6, third side block 8, and fifth side block 10, this will make it possible to improve performance with respect to traction at sidewall 22.

Moreover, presence of second side block 7, fourth side block 9, and sixth side block 11 will make it possible to improve performance with respect to protection (e.g., ability to suppress occurrence of damage in the form of cuts when impacted by rocks, stones, and the like) at sidewall 22 along the entire length thereof in the tire circumferential direction D3.

It is preferred, e.g., as is the case in the present embodiment, that first side block 6 comprise first base portion 6*a* which extends in the tire radial direction D2, and first inclined portion 6*b* and second inclined portion 6*c* which extend from the inner end in the tire radial direction D2 of first base portion 6*a*. In addition, it is preferred, for example, that first inclined portion 6*b* and second inclined portion 6*c* extend so as to be inclined with respect to the tire radial direction D2.

Because this will cause edges 6*d* of respective inclined portions 6*b*, 6*c* to extend so as to be inclined with respect to and to intersect edge 6*d* of first base portion 6*a*, this will make it possible to increase lengths of edges at first side block 6 more than would be the case were the constitution such that the entire block extended in the tire radial direction D2. This will make it possible to cause traction to be adequately produced by first side block 6.

Furthermore, it is preferred, e.g., as is the case in the present embodiment, that first inclined portion 6b extend increasingly toward the first circumferential direction side D31 as one proceeds toward the interior in the tire radial direction D2, and that second inclined portion 6c extend increasingly toward the second circumferential direction side D32 as one proceeds toward the interior in the tire radial direction D2. Where this is the case, first inclined portion 6b and second inclined portion 6c will be inclined toward opposite sides with respect to the tire radial direction D2. Accordingly, it will be possible to cause traction to be definitively produced by first side block 6 regardless of the direction of rotation of tire 1.

For example, when tire 1 rotates toward the first circumferential direction side D31, it will be possible to cause traction which acts in the tire circumferential direction D3 to be produced at first base portion 6a and first inclined portion 6b, and it will moreover also be possible to cause traction which acts in the tire radial direction D2 to be produced at first inclined portion 6b. Furthermore, when tire 1 rotates toward the second circumferential direction side D32, it will be possible to cause traction which acts in the tire circumferential direction D3 to be produced at first base portion 6a and second inclined portion 6c, and it will moreover also be possible to cause traction which acts in the tire radial direction D2 to be produced at second inclined portion 6c.

Furthermore, whereas first base portion 6a may be arranged so as to intersect first tire meridional plane S2, it is preferred, for example, that first inclined portion 6b extend so as to intersect second tire meridional plane S3. In addition, it is even more preferred, for example, that first inclined portion 6b extend so as to intersect first tire meridional plane S2 and second tire meridional plane S3.

Where this is the case, first inclined portion 6b will extend so as to intersect tire meridional planes S2, S3 respectively in common thereto with first and second tread blocks 2a, 2b which are adjacent in the tire circumferential direction D3. Accordingly, because it will be possible to increase the length of first inclined portion 6b, it will be possible to ensure that lengths of edges at first inclined portion 6b are adequate.

In addition, in accordance with the present embodiment, because the maximum protruding height of first side block 6 is greater than the maximum protruding height of second side block 7, it is for example preferred that the inner end in the tire radial direction D2 of first inclined portion 6b be arranged toward the interior in the tire radial direction D2 from the inner end in the tire radial direction D2 of second side block 7.

This will make it possible to cause traction which acts in the tire circumferential direction D3 to be produced by first base portion 6a and first inclined portion 6b, and will moreover also make it possible to cause traction which acts in the tire radial direction D2 to be produced by first inclined portion 6b. Moreover, it is preferred that the maximum protruding heights of first base portion 6a and first inclined portion 6b respectively be greater than the maximum protruding height of second side block 7.

It is preferred, for example, that second inclined portion 6c extend so as to intersect fourth tire meridional plane S5 and fifth tire meridional plane S6. Where this is the case, second inclined portion 6c will extend so as to intersect tire meridional planes S5, S6 respectively in common thereto with first and third tread blocks 2a, 2c which are adjacent in the tire circumferential direction D3. Accordingly, because it will be possible to increase the length of second inclined portion 6c, it will be possible to ensure that lengths of edges at second inclined portion 6c are adequate.

In addition, in accordance with the present embodiment, because the maximum protruding height of first side block 6 is greater than the maximum protruding height of fourth side block 9, it is for example preferred that the inner end in the tire radial direction D2 of second inclined portion 6c be arranged toward the interior in the tire radial direction D2 from the inner end in the tire radial direction D2 of fourth side block 9.

This will make it possible to cause traction which acts in the tire circumferential direction D3 to be produced by first base portion 6a and second inclined portion 6c, and will moreover also make it possible to cause traction which acts in the tire radial direction D2 to be produced by second inclined portion 6c. Moreover, it is preferred that the maximum protruding heights of first base portion 6a and second inclined portion 6c respectively be greater than the maximum protruding height of fourth side block 9.

It is preferred, e.g., as is the case in the present embodiment, that the constitution be such that second side block 7 comprises second base portion 7a which extends in the tire radial direction D2, and third inclined portion 7b which extends from the inner end in the tire radial direction D2 of second base portion 7a. Because this will cause edge 7c of third inclined portion 7b to extend so as to be inclined with respect to and to intersect edge 7c of second base portion 7a, this will make it possible to increase lengths of edges at second side block 7.

In addition, it is preferred, for example, that the constitution be such that third inclined portion 7b extend increasingly toward the first circumferential direction side D31 as one proceeds toward the interior in the tire radial direction D2, and that the inner end in the tire radial direction D2 of third inclined portion 7b be arranged toward the interior in the tire radial direction D2 from the inner end in the tire radial direction D2 of third side block 8. This will make it possible, for example, for third inclined portion 7b to be arranged between first inclined portion 6b and third side block 8.

It is moreover preferred, for example, that third inclined portion 7b also extend so as to intersect third tire meridional plane S4 which is intersected by third side block 8. Because this will make it possible for third inclined portion 7b to be arranged not only such that it is between first inclined portion 6b and third side block 8 but also such that it is toward the interior in the tire radial direction D2 from third side block 8, this will make it possible to further improve performance with respect to protection at sidewall 22.

The inner end in the tire radial direction D2 of fourth side block 9 might, for example, be arranged toward the exterior in the tire radial direction D2 from the respective inner ends in the tire radial direction D2 of first side block 6, second side block 7, and sixth side block 11. This will make it possible, for example, for the dimension in the tire radial direction D2 of fourth side block 9 to be less than the respective dimensions in the tire radial direction D2 of first side block 6, second side block 7, and sixth side block 11.

The inner end in the tire radial direction D2 of fifth side block 10 might, for example, be arranged toward the exterior in the tire radial direction D2 from the respective inner ends in the tire radial direction D2 of first side block 6, second side block 7, and sixth side block 11. This will make it possible, for example, for the dimension in the tire radial direction D2 of fifth side block 10 to be less than the respective dimensions in the tire radial direction D2 of first side block 6, second side block 7, and sixth side block 11.

In addition, to address the fact that there is a tendency for rigidity at fourth side block 9 and fifth side block 10 to decrease when the dimensions in the tire radial direction D2 of fourth side block 9 and fifth side block 10 are small, it is preferred, e.g., as is the case in the present embodiment, that fourth side block 9 and fifth side block 10 be mutually connected. As a result, because this will make it possible for fourth side block 9 and fifth side block 10 to mutually reinforce one another, this will make it possible to suppress reduction in rigidity at fourth side block 9 and fifth side block 10.

It is preferred, e.g., as is the case in the present embodiment, that the constitution be such that sixth side block 11 comprises third base portion 11a which extends in the tire radial direction D2, and fourth inclined portion 11b which extends from the inner end in the tire radial direction D2 of third base portion 11a. Because this will cause edge 11c of fourth inclined portion 11b to extend so as to be inclined with respect to and to intersect edge 11c of third base portion 11a, this will make it possible to increase lengths of edges at sixth side block 11.

Fourth inclined portion 11b may, for example, extend increasingly toward the first circumferential direction side D31 as one proceeds toward the interior in the tire radial direction D2. In addition, sixth side block 11 might, for example, intersect fifth tire meridional plane S6. Accordingly, this would mean that second inclined portion 6c of first side block 6, fifth side block 10, and fourth inclined portion 11b of sixth side block 11 will intersect a common fifth tire meridional plane S6.

Thus, in accordance with the present embodiment, second inclined portion 6c would intersect tire meridional planes S5, S6 which are in common thereto with fourth side block 9, fifth side block 10, and sixth side block 11. In addition, in accordance with the present embodiment, in contradistinction to the fact that the maximum protruding height of fifth side block 10 is greater than the respective maximum protruding heights of fourth side block 9 and sixth side block 11, it is preferred, for example, that the distance between second inclined portion 6c and fifth side block 10 be increased.

More specifically, it is preferred that the minimum distance between second inclined portion 6c and fifth side block 10 be greater than the minimum distance between second inclined portion 6c and fourth side block 9, and also be greater than the minimum distance between second inclined portion 6c and sixth side block 11. This will make it possible to effectively achieve performance with respect to traction due to second inclined portion 6c, for example.

At FIG. 3 and FIG. 4, note that boundaries between respective base portions 6a, 7a, 11a and respective inclined portions 6b, 6c, 7b, 11b are shown in dashed line. For example, the regions of respective inclined portions 6b, 6c, 7b, 11b might be taken to be the regions formed by causing the end portions of edges 6d, 7c, 11c to be mutually connected by straight lines (the dashed lines in FIG. 3 and FIG. 4) in such fashion that edges 6d, 7c, 11c form endless loops.

Furthermore, as shown in FIG. 4, it is also possible to adopt a constitution in which, for example, first side block 6 comprises apex 6e which constitutes the outer end face in the tire axial direction D1 thereof, side face 6f which respectively intersects and is contiguous with apex 6e and the outer surface of sidewall 22, and edge 6d which is formed at the boundary between apex 6e and side face 6f. In addition, apex 6e might, for example, comprise flat face 6g which is formed so as to be flat, and inclined face 6h which is arranged at second inclined portion 6c and which is inclined so as to intersect flat face 6g.

Figure 5:
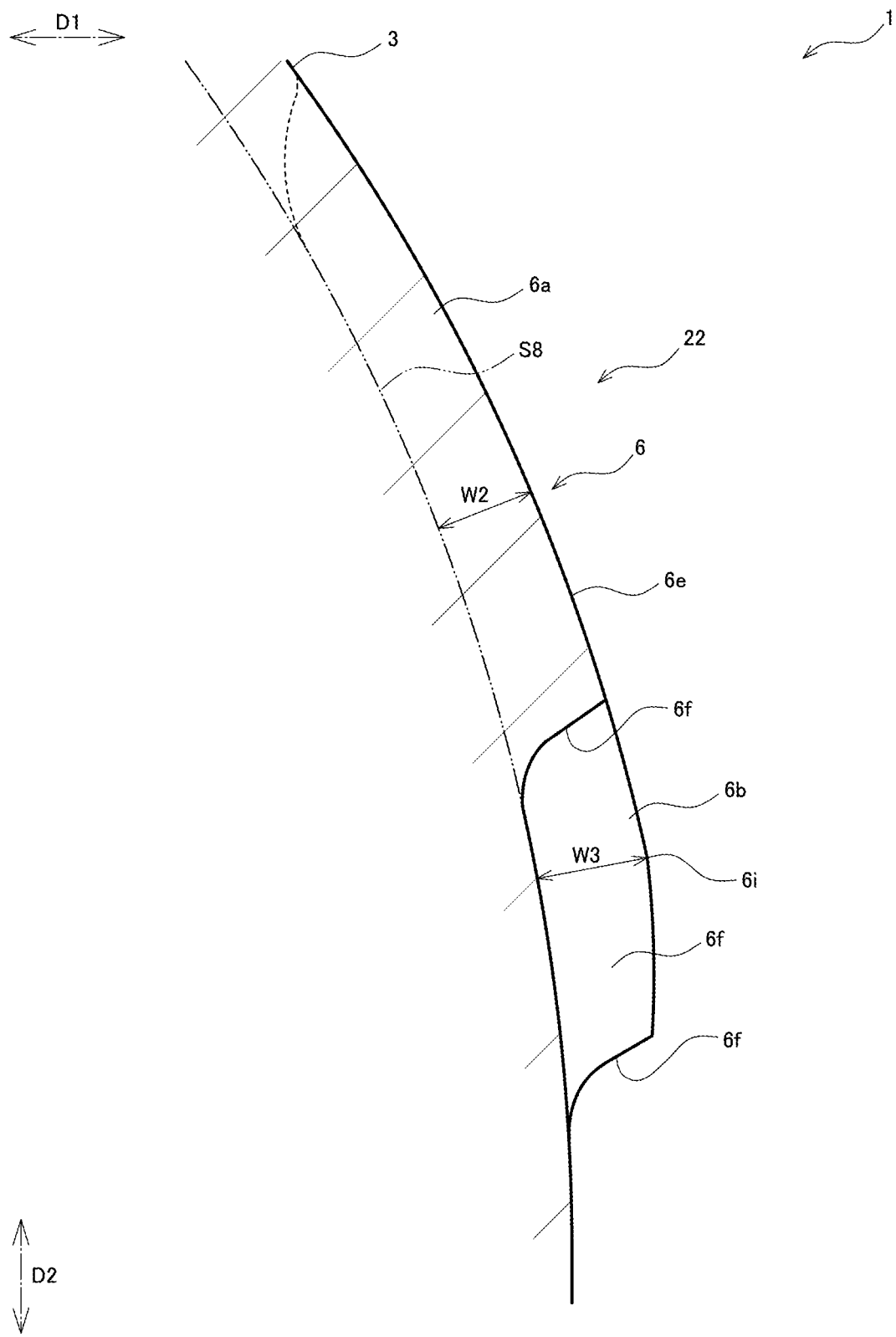
FIG. 5 a sectional view of the principal components in a section taken along V-V in FIG. 4.
Figure 6:
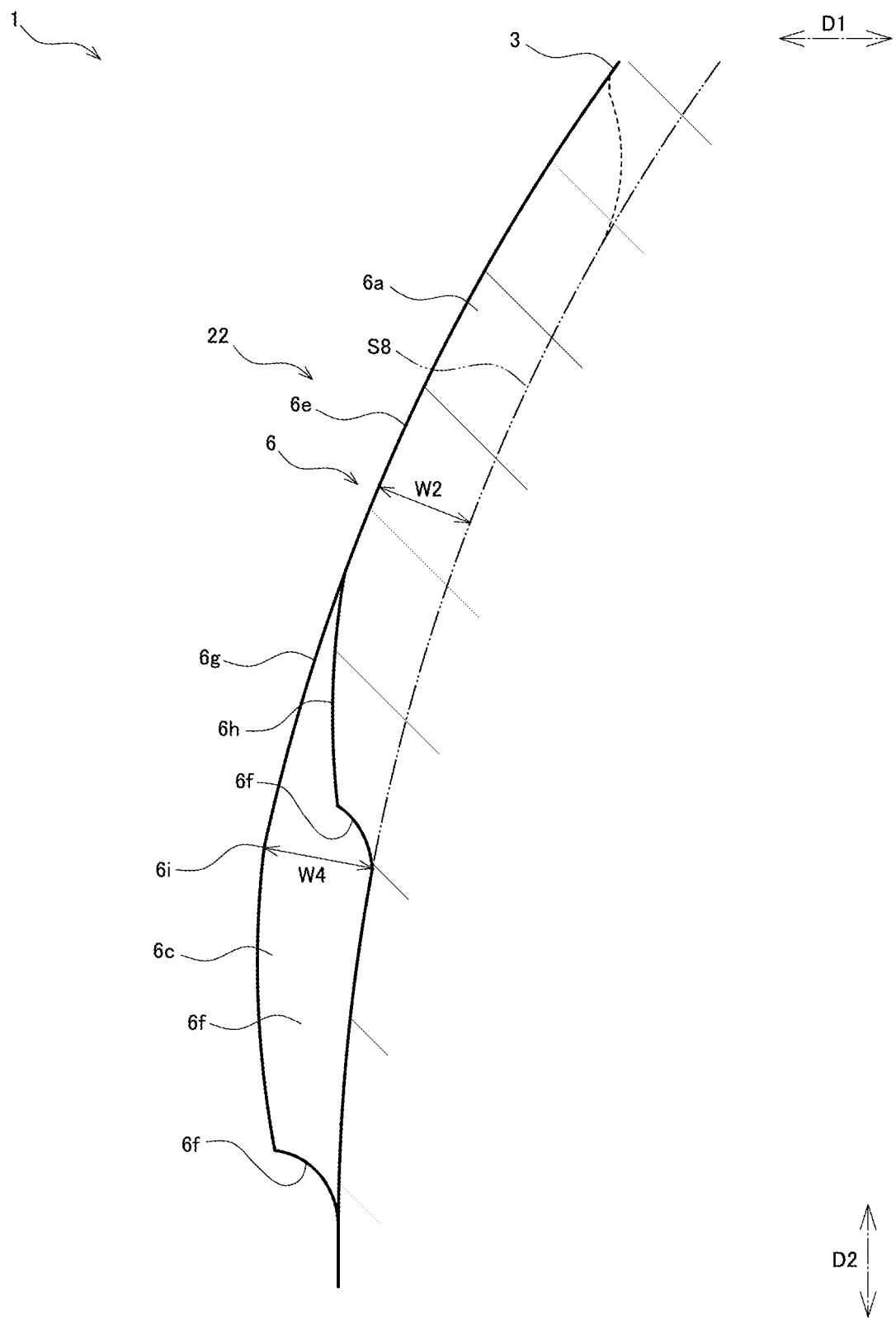
FIG. 6 a sectional view of the principal components in a section taken along VI-VI in FIG. 4.

In addition, as shown in FIG. 4 through FIG. 6, it is preferred, as is the case in the present embodiment, that a constitution be adopted in which whereas first side block 6 is for example arranged at a location toward the exterior in the tire radial direction D2 from tire maximum width location 22b (see FIG. 1), maximum protruding height W3 of first inclined portion 6b is for example greater than maximum protruding height W2 of first base portion 6a, and maximum protruding height W4 of second inclined portion 6c is for example greater than maximum protruding height W2 of first base portion 6a.

As a result, to address the fact that there is a tendency for tire 1 to be struck from the tire axial direction D1 by rocks, curbstones, and so forth at tire maximum width location 22b, this will make it possible to increase the heights to which first inclined portion 6b and second inclined portion 6c—which are near tire maximum width location 22b—protrude. Accordingly, this will make it possible to effectively improve performance with respect to protection at first side block 6.

Note that maximum protruding height W3 of first inclined portion 6b and maximum protruding height W4 of second inclined portion 6c may for example be the same as is the case in the present embodiment, or they may for example be different. That is, first side block 6 may for example, as is the case in the present embodiment, comprise a maximum height location 6i—a location at which protruding height is a maximum—at each of both first inclined portion 6b and second inclined portion 6c, or it may for example comprise a maximum height location 6i at either first inclined portion 6b or second inclined portion 6c.

It is preferred, e.g., as is the case in the present embodiment, that the constitution be such that the average protruding height of first inclined portion 6b be greater than the average protruding height of first base portion 6a. Furthermore, it is preferred, e.g., as is the case in the present embodiment, that the constitution be such that the average protruding height of second inclined portion 6c be greater than the average protruding height of first base portion 6a.

Note that what is referred to as the protruding heights of side blocks 6, 7, 6, 9, 10, 11 and respective portions 6a, 6b, 6c might be taken to be the heights of protrusion thereof in a direction normal to profile surface S8 of sidewall 22. Furthermore, profile surface S8 of sidewall 22 might, for example, be made up of a plurality of arcs having differing radii of curvature in tire meridional sections S2 through S7.

Moreover, within the bounds of the regions in the tire radial direction D2 at which each of side blocks 6, 7, 8, 9, 10, 11 is located, profile surface S8 of sidewall 22 may be made up of a single arc in tire meridional sections S2 through S7. In addition, said arcs may be continuous with arcs of profile surface S8 at portions adjacent and toward the interior in the tire radial direction D2 from side blocks 6, 7, 8, 9, 10, 11. At FIG. 5 and FIG. 6, the boundary between first side block 6 and annular projection 3 is shown in dashed line.

As described above, as in the present embodiment, it is preferred that a pneumatic 1 tire comprises a sidewall 22 extending in a tire radial direction D2;

wherein the sidewall 22 comprises a first side block 6 which protrudes outwardly in a tire axial direction D1;

wherein the first side block 6 comprises
a first base portion 6a which extends in the tire radial direction D2, and
a first inclined portion 6b and second inclined portion 6c which extend from an inner end in the tire radial direction D2 of the first base portion 6a;
wherein the inclined portion 6b extends increasingly toward a first side D31 in a tire circumferential direction D3 as one proceeds toward an interior in the tire radial direction D2; and
wherein the second inclined portion 6c extends increasingly toward a second side D32 in the tire circumferential direction D3 as one proceeds toward the interior in the tire radial direction D2.

In accordance with such constitution, because first inclined portion 6b and second inclined portion 6c extend increasingly toward the tire circumferential direction D3 as one proceeds toward the interior in the tire radial direction D2, this makes it possible to increase the lengths of edges at first side block 6. This makes it possible to cause traction to be adequately produced by first side block 6.

Moreover, because first inclined portion 6b extends increasingly toward the first side D31 in the circumferential direction D3 as one proceeds toward the interior in the tire radial direction D2, and second inclined portion 6c extends increasingly toward the second side D32 in the circumferential direction D3 as one proceeds toward the interior in the tire radial direction D2, first inclined portion 6b and second inclined portion 6c are inclined toward opposite sides with respect to the tire radial direction D2. This makes it possible to cause traction to be definitively produced by first side block 6 regardless of the direction of rotation of tire 1. Accordingly, it will be possible to improve performance with respect to traction at sidewall 22.

Further, as in the present embodiment, it is preferred that the pneumatic tire 1 includes a configuration in which:
the sidewall 22 further comprises a second side block 7 which protrudes outwardly in the tire axial direction D1;
the second side block 7 is adjacent at the first side D31 in the tire circumferential direction D3 to the first side block 6;
the first inclined portion 6b and the second side block 7 respectively intersect a common first tire meridional plane S3;
an inner end in the tire radial direction D2 of the first inclined portion 6b is arranged to and the interior in the tire radial direction D2 from an inner end in the tire radial direction D2 of the second side block 7; and
maximum protruding height of the first side block 6 is greater than maximum protruding height of the second side block 7.

In accordance with such constitution, because first inclined portion 6b extends so as to intersect tire meridional plane 33 in common thereto with second side block 7, it is possible to increase the lengths of edges at first inclined portion 6b. In addition, first inclined portion 6b is arranged toward the interior in the tire radial direction D2 from second side block 7, and the maximum protruding height of first side block 6 is greater than the maximum protruding height of second side block 7.

This makes it possible to cause traction which acts in the tire circumferential direction D3 to be produced by first base portion 6a and first inclined portion 6b, and moreover also makes it possible to cause traction which acts in the tire radial direction D2 to be produced by first inclined portion 6b. Accordingly, this makes it possible to achieve performance with respect to traction due to first side block 6.

Further, as in the present embodiment, it is preferred that the pneumatic tire 1 includes a configuration in which:
the sidewall 22 further comprises a third side block 8 which protrudes outwardly in the tire axial direction D1;
the third side block 8 is adjacent at the first side D31 in the tire circumferential direction D3 to the second side block 7;
maximum protruding height of the third side block 8 greater than maximum protruding height of the second side block 7;
the second side block 7 comprises
a second base portion 7a which extends in the tire radial direction D2, and
a third inclined portion 7b which extends from an inner end in the tire radial direction D2 of the second base portion 7a;
the third inclined portion 7b extends increasingly toward the first side D31 in the tire circumferential direction D3 as one proceeds toward the interior in the tire radial direction D2;
an inner end in the tire radial direction D2 of the third inclined portion 7b is arranged toward the interior in the tire radial direction D2 from an inner end in the tire radial direction D2 of the third side block 8; and
the third inclined portion 7b and the third side block 8 respectively intersect a common second tire meridional plane S4.

In accordance with such constitution, the maximum protruding height of third side block 8 is greater than the maximum protruding height of second side block 7. This makes it possible to adequately cause traction which acts in the tire circumferential direction D3 to be produced by third side block 8.

In addition, because third inclined portion 7b of second side block 7 is arranged toward the interior in the tire radial direction D2 from third side block 8, it is possible for second base portion 7a and third inclined portion 7b of second side block 7 to be arranged along the space between and first side block 6 and third side block 8. Accordingly, it will be possible to further improve performance with respect to protection at sidewall 22 due to second side block 7.

Further, as in the present embodiment, it is preferred that the pneumatic tire 1 includes a configuration in which:
the sidewall 22 further comprises a fourth side block 9 which protrudes outwardly in the tire axial direction D1;
the fourth side block 9 is adjacent at the second side D32 in the tire circumferential direction D3 to the first side block 6;
the second inclined portion 6c and the fourth side block 9 respectively intersect a common third tire meridional plane S5;
an inner end in the tire radial direction D2 of the second inclined portion 6c is arranged toward the interior in the tire radial direction D2 from an inner end in the tire radial direction D2 of the fourth side block 9; and
maximum protruding height of the first side block 6 is greater than maximum protruding eight of the fourth side block 9.

In accordance with such constitution, because second inclined portion 6c extends so as to intersect tire meridional plane S5 in common thereto with fourth side block 9, it is possible to increase the lengths of edges at second inclined portion 6c. In addition, second inclined portion 6c is arranged toward the interior in the tire radial direction D2 from fourth side block 9, and the maximum protruding height of first side block 6 is greater than the maximum protruding height of fourth side block 9.

This makes it possible to cause traction which acts in the tire circumferential direction D3 to be produced by first base portion 6a and second inclined portion 6c, and moreover also makes it possible to cause traction which acts in the tire radial direction D2 to be produced by second inclined portion 6c. Accordingly, this makes it possible to achieve performance with respect to traction due to first side block 6.

Further, as in the present embodiment, it is preferred that the pneumatic tire 1 includes a configuration in which:

the sidewall 22 comprises a tire maximum width location 22b at which a dimension W1 in the tire axial direction D1 of the pneumatic tire 1 is a maximum;

the first side block 6 is arranged toward an exterior in the tire radial direction D2 from the tire maximum width location 22b;

maximum protruding height W3 of the first inclined portion 6b is greater than maximum protruding height W2 of the first base portion 6a; and maximum protruding height W4 of the second inclined portion 6c is greater than maximum protruding height W2 of the first base portion 6a.

In accordance with such constitution, to address the fact that there is a tendency for tire 1 to be struck from the tire axial direction D1 at tire maximum width location 22b, it is possible to increase the maximum protruding heights W3, W4 of first inclined portion 6b and second inclined portion 6c, which are near tire maximum width location 22b. This makes it possible to effectively improve performance with respect to protection at first side block 6.

Further, as in the present embodiment, it is preferred that the pneumatic tire 1 further includes:

a tread 23 which is contiguous with an outer end in the tire radial direction D2 of the sidewall 22;

wherein the tread 23 comprises a plurality of main grooves 23e which extend continuously in the tire circumferential direction D3;

wherein the plurality of main grooves 23e include a shoulder main groove 23e which is arranged so as to be outermost in the tire axial direction D1;

wherein the tread 23 comprises a plurality of width grooves 23f which extend from the shoulder main groove 23e to an outer end in the tire axial direction D1, and a plurality of tread blocks 2 which are partitioned by the shoulder main groove 23e, and the plurality of width grooves 23f;

wherein the plurality of tread blocks 2 include a first tread block 2a, a second tread block 2b which is adjacent at the first side D31 in the tire circumferential direction D3 to the first tread block 2a, and a third tread block 2c which is adjacent at the second side D32 in the tire circumferential direction D3 to the first tread block 2a;

wherein the first base portion 6a and the first tread block 2a intersect a common fourth tire meridional plane S2;

wherein the first inclined portion 6b and the second tread block 2b intersect a common fifth tire meridional plane S3; and wherein the second inclined portion 6c and the third tread block 2c intersect a common six tire meridional plane S6.

In accordance with such constitution, first side block 6 is arranged so as to intersect tire meridional planes S2, S3, S6 which are in common thereto with first through third tread blocks 2a, 2b, 2c which are adjacent in the tire circumferential direction D3. Because this makes it possible to increase the lengths of first inclined portion 6b and second inclined portion 6c, this makes it possible to ensure that lengths of edges at first side block 6 are adequate.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) At pneumatic tire 1, there is no particular limitation with respect to the relationships regarding how high and/or low (relationships regarding how high and/or relationships regarding how low) the maximum protruding heights at first through sixth side blocks 6, 7, 8, 9, 10, 11 are, for example. Furthermore, at pneumatic tire 1, there is no particular limitation with regard to the positional relationships with respect to the inner ends in the tire radial direction D2 (the relationships with regard to whether these are toward the interior or toward the exterior in the tire radial direction D2) of first through sixth side blocks 6, 7, 8, 9, 10, 11, for example.

(2) Furthermore, the constitution of pneumatic tire 1 associated with the foregoing embodiment is such that a maximum height location 6i of first side block 6 is arranged at each of both first inclined portion 6b and second inclined portion 6c. However, pneumatic tire 1 not limited to such constitution. For example, it is also possible to adopt a constitution in which a maximum height location 6i of first side block 6 is arranged at either first inclined portion 6b or second inclined portion 6c. Note that it is also possible to adopt a constitution in which a maximum height location 6i of first side block 6 is arranged at first base portion 6a.

(3) Furthermore, the constitution of pneumatic tire 1 associated with the foregoing embodiment is such that maximum protruding height W3 of first inclined portion 6b is greater than maximum protruding height W2 of first base portion 6a, and maximum protruding height W4 of second inclined portion 6c is greater than maximum protruding height W2 of first base portion 6a. However, pneumatic tire 1 is not limited to such constitution.

For example, it is also possible to adopt a constitution in which maximum protruding height W3 of first inclined portion 6b is less than maximum protruding height W2 of first base portion 6a. Furthermore, for example, it is also possible to adopt a constitution in which maximum protruding height W4 of second inclined portion 6c is less than maximum protruding height W2 of first base portion 6a.

(4) Furthermore, the constitution of pneumatic tire 1 associated with the foregoing embodiment is such that side blocks 5, 6, 7, 8, 9, 10, 11 are arranged toward the interior in the tire radial direction D2 from annular projection 3. However, pneumatic tire 1 is not limited to such constitution. For example, a constitution may be adopted in which side block(s) 5, 6, 7, 8, 9, 10, 11 are arranged toward the exterior the tire radial direction D2 from annular projection 3. Furthermore, a constitution may be adopted in which, for example, sidewall 22 does not comprise at least one of annular projection 3 and buttress block 4.

The invention claimed is:

1. A pneumatic tire comprising a sidewall extending in a tire radial direction;

wherein the sidewall comprises a first side block which protrudes outwardly in a tire axial direction;

wherein the first side block comprises a first base portion which extends in the tire radial direction, and a first inclined portion and second inclined portion which extend from an inner end in the tire radial direction of the first base portion;

wherein the first inclined portion extends increasingly toward a first side in a tire circumferential direction as one proceeds toward an interior in the tire radial direction;

wherein the second inclined portion extends increasingly toward a second side in the tire circumferential direction as one proceeds toward the interior in the tire radial direction;

the sidewall further comprises a second side block which protrudes outwardly in the tire axial direction;

the second side block is adjacent at the first side in the tire circumferential direction to the first side block;

the first inclined portion and the second side block respectively intersect a common first tire meridional plane;

an inner end in the tire radial direction of the first inclined portion is arranged toward the interior in the tire radial direction from an inner end in the tire radial direction of the second side block;

the second side block comprises
a second base portion which extends in the tire radial direction, and
a third inclined portion which extends from an inner end in the tire radial direction of the second base portion; and the first inclined portion and the second base portion respectively intersect the common first tire meridional plane.

2. The pneumatic tire according to claim 1 wherein
the sidewall further comprises a fourth side block which protrudes outwardly in the tire axial direction;
the fourth side block is adjacent at the second side in the tire circumferential direction to the first side block;
the second inclined portion and the fourth side block respectively intersect a common third tire meridional plane;
an inner end in the tire radial direction of the second inclined portion is arranged toward the interior in the tire radial direction from an inner end in the tire radial direction of the fourth side block; and
maximum protruding height of the first side block is greater than maximum protruding height of the fourth side block.

3. The pneumatic tire according to claim 2 wherein
the sidewall further comprises a fifth side block which protrudes outwardly in the tire axial direction;
the fifth side block is adjacent at the second side in the tire circumferential direction to the fourth side block;
maximum protruding height of the fifth side block is greater than maximum protruding height of the fourth side block;
the second inclined portion and the fifth side block respectively intersect a common seventh tire meridional plane; and
an inner end in the tire radial direction of the second inclined portion is arranged toward the interior in the tire radial direction from an inner end in the tire radial direction of the fifth side block.

4. The pneumatic tire according to claim 3 wherein the fifth side block is connected to the fourth side block.

5. The pneumatic tire according to claim 3 wherein minimum distance between the fifth side block and the second inclined portion is greater than minimum distance between the fourth side block and the second inclined portion.

6. The pneumatic tire according to claim 3 wherein
the sidewall further comprises a sixth side block which protrudes outwardly in the tire axial direction;
the sixth side block is adjacent at the second side in the tire circumferential direction to the fifth side block;
maximum protruding height of the sixth side block is less than maximum protruding height of the fifth side block;
the sixth side block comprises
a third base portion which extends in the tire radial direction, and
a fourth inclined portion which extends from an inner end in the tire radial direction of the third base portion;
the fourth inclined portion extends increasingly toward the first side in the tire circumferential direction as one proceeds toward the interior in the tire radial direction;
an inner end in the tire radial direction of the fourth inclined portion is arranged toward the interior in the tire radial direction from an inner end in the tire radial direction of the fifth side block; and
the fourth inclined portion and the fifth side block respectively intersect a common eighth tire meridional plane.

7. The pneumatic tire according to claim 6 wherein
the second inclined portion and the fourth inclined portion and the fifth side block respectively intersect the common seventh tire meridional plane.

8. The pneumatic tire according to claim 7 wherein minimum distance between the fifth side block and the second inclined portion is greater than minimum distance between the sixth side block and the second inclined portion.

9. The pneumatic tire according to claim 1 wherein
the sidewall comprises a tire maximum width location at which a dimension in the tire axial direction of the pneumatic tire is a maximum;
the first side block is arranged toward an exterior in the tire radial direction from the tire maximum width location;
maximum protruding height of the first inclined portion is greater than maximum protruding height of the first base portion; and
maximum protruding height of the second inclined portion is greater than maximum protruding height of the first base portion.

10. The pneumatic tire according to claim 1 wherein
the third inclined portion extends increasingly toward the first side in the tire circumferential direction as one proceeds toward the interior in the tire radial direction; and
the first inclined portion and the third inclined portion respectively intersect the common first tire meridional plane.

11. The pneumatic tire according to claim 10 wherein the sidewall further comprises a third side block which protrudes outwardly in the tire axial direction;
the third side block is adjacent at the first side in the tire circumferential direction to the second side block;
maximum protruding height of the third side block is greater than maximum protruding height of the second side block;
an inner end in the tire radial direction of the third inclined portion is arranged toward the interior in the tire radial direction from an inner end in the tire radial direction of the third side block; and
the third inclined portion and the third side block respectively intersect a common second tire meridional plane.

12. The pneumatic tire according to claim 11 wherein
the sidewall further comprises a fourth side block which protrudes outwardly in the tire axial direction;
the fourth side block is adjacent at the second side in the tire circumferential direction to the first side block;
the second inclined portion and the fourth side block respectively intersect a common ninth tire meridional plane;
an inner end in the tire radial direction of the second inclined portion is arranged toward the interior in the tire radial direction from an inner end in the tire radial direction of the fourth side block; and
maximum protruding height of the first side block is greater than maximum protruding height of the fourth side block.

13. The pneumatic tire according to claim 12 wherein
the sidewall further comprises a fifth side block which protrudes outwardly in the tire axial direction;
the fifth side block is adjacent at the second side in the tire circumferential direction to the fourth side block;
maximum protruding height of the fifth side block is greater than maximum protruding height of the fourth side block;
the second inclined portion and the fifth side block respectively intersect a common tenth tire meridional plane; and
an inner end in the tire radial direction of the second inclined portion is arranged toward the interior in the tire radial direction from an inner end in the tire radial direction of the fifth side block.

14. The pneumatic tire according to claim 13 wherein the fifth side block is connected to the fourth side block.

15. The pneumatic tire according to claim 13 wherein minimum distance between the fifth side block and the second inclined portion is greater than minimum distance between the fourth side block and the second inclined portion.

16. The pneumatic tire according to claim 13 wherein
the sidewall further comprises a sixth side block which protrudes outwardly in the tire axial direction;
the sixth side block is adjacent at the second side in the tire circumferential direction to the fifth side block;
maximum protruding height of the sixth side block is less than maximum protruding height of the fifth side block;
the sixth side block comprises
a third base portion which extends in the tire radial direction, and
a fourth inclined portion which extends from an inner end in the tire radial direction of the third base portion;
the fourth inclined portion extends increasingly toward the first side in the tire circumferential direction as one proceeds toward the interior in the tire radial direction;
an inner end in the tire radial direction of the fourth inclined portion is arranged toward the interior in the tire radial direction from an inner end in the tire radial direction of the fifth side block;
the fourth inclined portion and the fifth side block respectively intersect a common eleventh tire meridional plane; and
the second inclined portion and the fourth inclined portion and the fifth side block respectively intersect the common tenth tire meridional plane.

17. The pneumatic tire according to claim 16 wherein minimum distance between the fifth side block and the second inclined portion is greater than minimum distance between the sixth side block and the second inclined portion.

18. The pneumatic tire comprises:
a sidewall extending in a tire radial direction;
wherein the sidewall comprises a first side block which protrudes outwardly in a tire axial direction;
wherein the first side block comprises
a first base portion which extends in the tire radial direction, and
a first inclined portion and second inclined portion which extend from an inner end in the tire radial direction of the first base portion;
wherein the first inclined portion extends increasingly toward a first side in a tire circumferential direction as one proceeds toward an interior in the tire radial direction;
wherein the second inclined portion extends increasingly toward a second side in the tire circumferential direction as one proceeds toward the interior in the tire radial direction;
the sidewall further comprises a second side block which protrudes outwardly in the tire axial direction;
the second side block is adjacent at the first side in the tire circumferential direction to the first side block;
the first inclined portion and the second side block respectively intersect a common first tire meridional plane;
an inner end in the tire radial direction of the first inclined portion is arranged toward the interior in the tire radial direction from an inner end in the tire radial direction of the second side block;
the sidewall further comprises an annular projection that extends continuously in the tire circumferential direction along the entire length of the sidewall in the tire circumferential direction;
an outer end in the tire radial direction of the first side block is contiguous with the annular projection; and
an outer end in the tire radial direction of the second side block is contiguous with the annular projection.

19. The pneumatic tire according to claim 18 wherein
maximum protruding height of the first side block is greater than maximum protruding height of the second side block; and
the sidewall further comprises a plurality of buttress blocks which are arranged toward the exterior in the tire radial direction from the annular projection.

20. A pneumatic tire comprising:
a sidewall extending in a tire radial direction;
wherein the sidewall comprises a first side block which protrudes outwardly in a tire axial direction;
wherein the first side block comprises
a first base portion which extends in the tire radial direction, and
a first inclined portion and second inclined portion which extend from an inner end in the tire radial direction of the first base portion;
wherein the first inclined portion extends increasingly toward a first side in a tire circumferential direction as one proceeds toward an interior in the tire radial direction;
wherein the second inclined portion extends increasingly toward a second side in the tire circumferential direction as one proceeds toward the interior in the tire radial direction;
a tread which is contiguous with an outer end in the tire radial direction of the sidewall;
wherein the tread comprises a plurality of main grooves which extend continuously in the tire circumferential direction;

wherein the plurality of main grooves include a shoulder main groove which is arranged so as to be outermost in the tire axial direction;

wherein the tread comprises a plurality of width grooves which extend from the shoulder main groove to an outer end in the tire axial direction, and a plurality of tread blocks which are partitioned by the shoulder main groove and the plurality of width grooves;

wherein the plurality of tread blocks include a first tread block, a second tread block which is adjacent at the first side in the tire circumferential direction to the first tread block, and a third tread block which is adjacent at the second side in the tire circumferential direction to the first tread block;

wherein the first base portion and the first tread block intersect a common fourth tire meridional plane;

wherein the first inclined portion and the second tread block intersect a common fifth tire meridional plane; and wherein the second inclined portion and the third tread block intersect a common six tire meridional plane.

\* \* \* \* \*